United States Patent Office 3,460,035
Patented Aug. 5, 1969

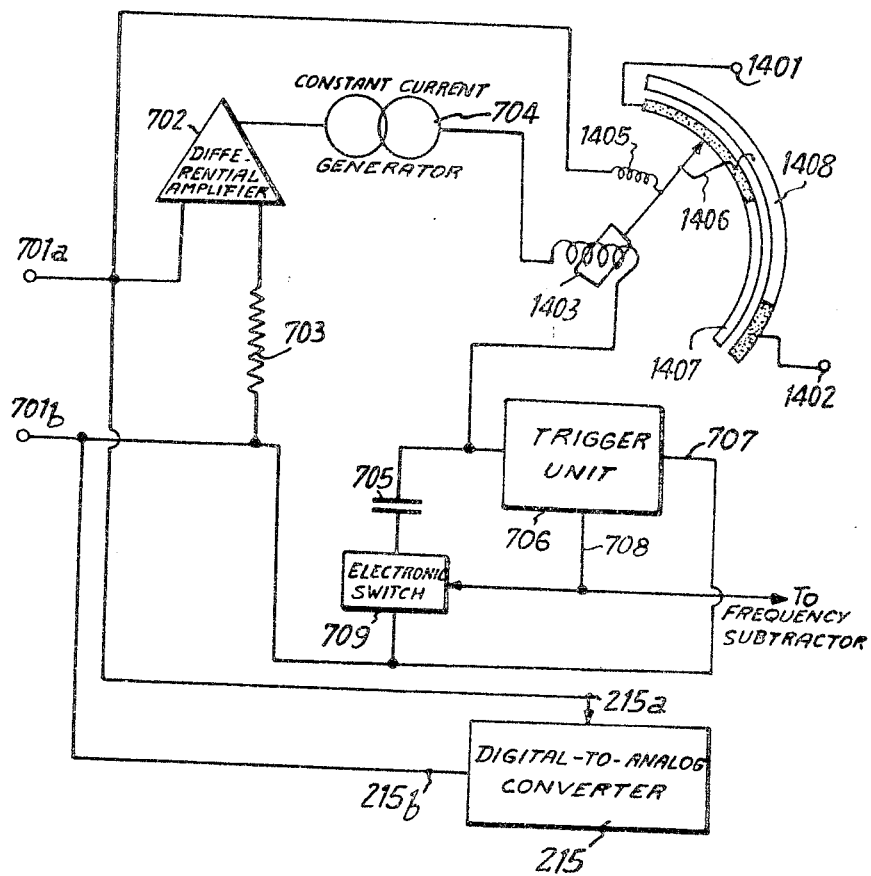

3,460,035
AUTOMATIC CONTROL OF THE BASE LINE IN THE UTILIZATION OF VARIABLE ELECTRICAL RESPONSE
Bernard Louvel, Pau, France, assignor to Societe Anonyme dite: Societe Nationales des Petroles d'Aquitaine, Courbevoie, France
Continuation-in-part of application Ser. No. 255,822, Feb. 4, 1963. This application Nov. 7, 1966, Ser. No. 592,430
Claims priority, application France, Feb. 5, 1962, 886,951
Int. Cl. G01r 19/16, 1/02, 17/06
U.S. Cl. 324—103        4 Claims

ABSTRACT OF THE DISCLOSURE

The invention is broadly concerned with problems which arise when attempting to measure a given signal, be it voltage or current, relative to a base line (i.e., a reference line). Specifically, if the base line should vary or drift, then the measurements taken relative thereto will never be reliable. The instant invention provides means whereby the base line will be kept constant.

---

This application is a continuation-in-part of application Ser. No. 255,822, filed Feb. 4, 1963.

This invention relates to the control of the variable response of an electrical apparatus, said variable response including a succession of comparatively steep high amplitude voltage variations or "peaks" and having, between the peaks, a comparatively slowly drifting minimal value or "base line."

The invention relates more particularly to a device for automatically resetting the base line to a constant reference voltage, while the elecrical apparatus is in operation.

It is at present very common to translate into an electrical factor—voltage or current—the concentrations of a compound or element contained in a mixture subjected to analysis. Thus, the response is generally electrical in infrared analysers and other spectrophotometers, nephelometers, photoelectric colorimeters, pH-meters, polarographs, chromatographs, etc. The same is the case with various instruments adapted for measuring physical quantities, notably calorimeters, pyrometers, flow meters, colorimeters, etc.

Some of the above instruments provide an electrical response including a number of successive peaks, respectively, containing items of information of different natures, which are to be measured and, in general, recorded. What is to be measured is the maximal amplitude of each peak with respect to the corresponding amplitude of the base line, and also the area of the surface of the peaks.

Since the base line itself continuously varies, it is desirable automatically and accurately to reset it to zero.

In prior art instruments of the type defined hereinabove, the current practice has consisted of generating a correction signal by means of a potentiometer controlled by the peak recorder and to oppose the correction signal to the base line signal to reset the base line signal to zero. Such a feedback regulation method has the drawbacks of making use of movable parts and of being liable to hunting, resulting in a poor accuracy and dependability of the correction system.

Moreover, as the resetting of the base line should be carried out in the intervals between the peaks and interrupted each time a peak occurs, and as the operations of measuring and recording or storing the peaks are, according to the kind of measurement or analysis which is to be performed, subjected to different types of controlling programmes, the conventional feedback method lacks the flexibility and the versatility which should be highly desirable in practice.

Accordingly, it is an object of the present invention to provide a device which is adapted for automatically resetting the base line to a predetermined reference voltage, said device not making use of any moving part except the movable member of the recorder, but however utilizing highly dependable and currently available electronic circuits, yet providing an accurate correction without any hunting.

It is another object of the present invention to provide a device adapted for automatically resetting the base line which involves the coincidence of gating signals and is therefore particularly adapted for use in the processing, according to a variety of programmes, of an electrical response of the type defined.

Yet a further object of this invention is to provide a processing apparatus including measuring means having a signal input and a movable member the position of which is indicative of the level of the electrical response signal which is applied to said measuring means, said measuring means further including first means for generating a first control voltage each time the said signal has an amplitude lower than a reference level and second means for generating a second control voltage each time the said signal exceeds the reference level; a reversible counter having an analog output, a pulse input and first and second control terminals, said first and second terminals being respectively connected to said first and second means; a clock pulse generator, means connecting said clock pulse generator to the said pulse input, said counter being adapted for counting up each time the first control voltage is applied to the said first control terminal and for counting down each time the second control voltage is applied to the said second control terminal, and means connecting the said analog output to the signal input of said measuring means.

Such a processing apparatus will be designated hereinafter as "a processing apparatus of the type defined."

It is a further object of this invention to provide a processing apparatus of the type defined, wherein the measuring means may be, either a paper chart recorder provided with a "zero" contact or a galvanometer relay unit also provided with a "zero" contact. Said galvanometer relay unit may be connected in the circuit of a voltage-to-frequency converter having a signal input which is connected to the analog output of the reversible counter, said converter providing a digital indication of the electrical response signal.

Still another object of this invention is to provide an apparatus of the type defined, wherein the measuring means include a "zero" contact which is incorporated in the circuit of the said first means, said apparatus further comprising means for closing the gating means each time the electrical response signal reaches the said reference level while varying in a predetermined direction.

These and other objects of the present invention will become readily apparent from the following description.

In the appended drawings:

FIG. 5 is a diagrammatic illustration of a preferred embodiment of the voltage-to-frequency converter.

Figure 1:
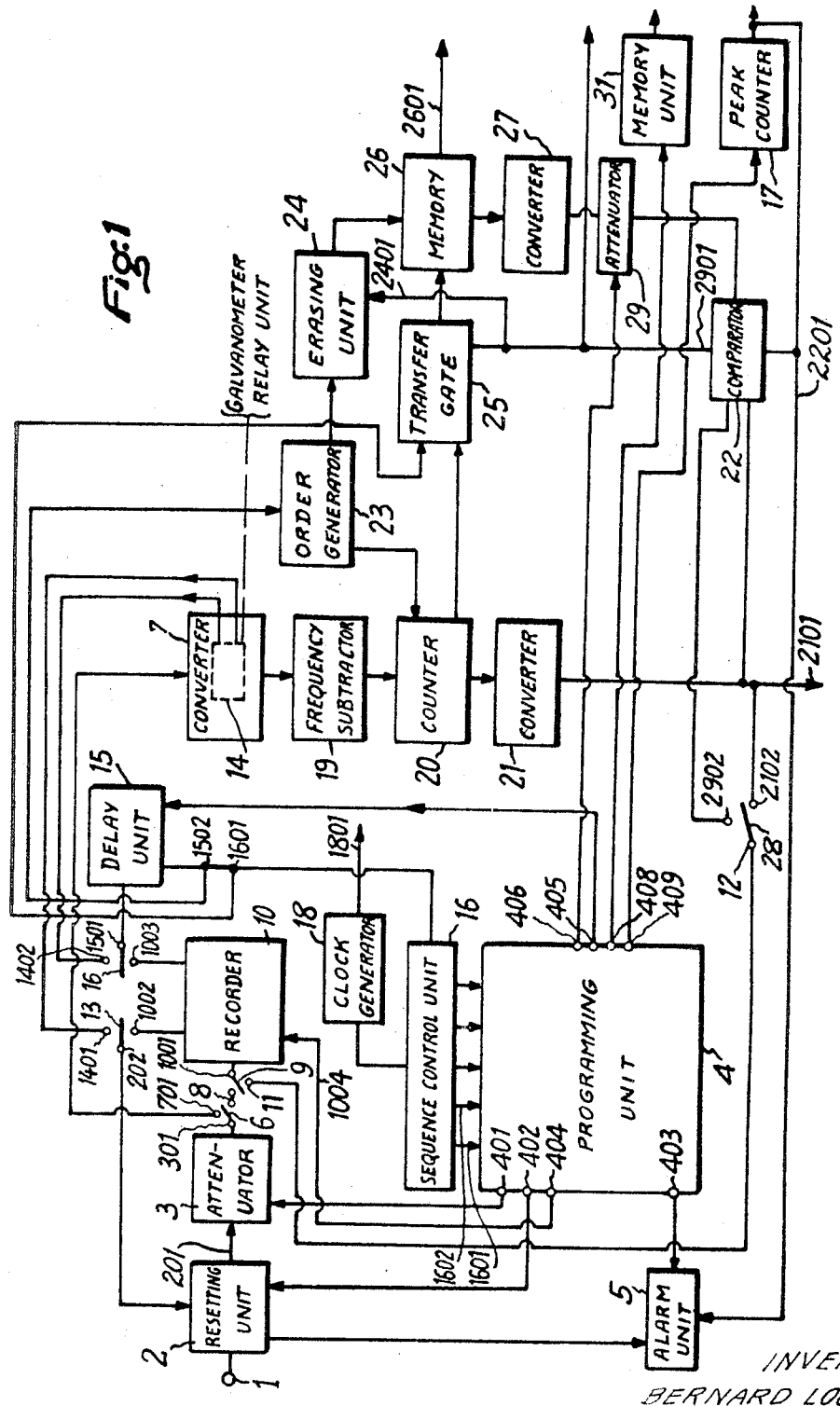
FIG. 1 is a general block diagram of a processing apparatus of the type defined.

The processing apparatus, as illustrated in FIG. 1, receives the electrical signal to be processed, which comes for instance from the output of the electrical measuring unit included in a chromatograph, at input terminal 1.

As well known, the said signal includes a succession of comparatively steep high amplitude voltage variations or "peaks" and, between the peaks, it has a comparatively slowly drifting minimal value or "base line." The signal is applied to a device 2, which will be termed hereinafter a "resetting unit" and performs the function of automatically resetting the base line to a constant reference voltage.

The resetting unit 2 has an output 201 which is connected to an input of a variable attenuator network 3. The said attenuator has a control input which is connected to an output 401 of a programming unit 4. The resetting unit also has a control input which is connected to a further output 402 of the programming unit, and a further output which is connected to an alarm unit 5, in turn connected to a further terminal 403 of the programming unit.

The attenuator has an output 301 which is connected, through a switch 6, either to the input terminal 701 of a voltage-to-frequency converter 7, or to a terminal 8. The terminal 8 is in turn connected, through a switch 9, either to an input 1001 of a recorder 10, or to a further terminal 11 in turn connected to a terminal 12.

The recorder 10 has further terminals 1002 and 1003 and a control input 1004, the latter being connected to an output 404 of the programming unit.

The resetting unit has a further control input 202 which is connected, through a switch 13, either to terminal 1002 or to an output 1401 of a relay galvanometer unit 14, which is in fact a part of the converter 7 as will be explained hereinafter with reference to FIG. 5.

The galvanometer relay 14 has a further output 1402. A delayed pulse generator unit 15 has an output 1501 which is connected, through a switch 16, either to terminal 1003 or to terminal 1402, a further output 1502, which is permanently connected to an input of a generator 23, the latter being adapted for producing resetting order signals, as will be explained hereinafter. The generator 23 has a further input which is connected to an input terminal 1601 of a sequence control unit 16. Terminals 1502 and 1601 are connected together. The sequence control unit 16 has a plurality of outputs which are connected to respective inputs of the programming unit 4. The latter has an output 405 which is connected to a control input of delay unit 15.

The sequence control unit has an input which is connected to an output of a clock generator 18. The latter generator has a further output 1801.

The voltage-to-frequency converter 7 has an output which is connected to the input of a device 19 which is adapted for subtracting a constant frequency from the frequency of the pulses generated at the output of converter 7. The output of the frequency subtractor 19 is connected to the input of a counter 20, in turn having an output which is connected to the input of a digital-to-analog converter 21. Converter 21 has an output which is connected to an input of a voltage comparator 22, to an output lead 2101, and to a terminal 2102.

The order generator 23 has a first output which is connected to an input of an erasing signal generator 24 and a second output which is connected to a resetting control input of counter 20.

Terminal 1601 is connected to an input of a transfer gate 25, which has a further input connected to an output of counter 20, and yet a further input connected to an output of comparator 22, together with an input 2401 of the erasing unit. The output of the transfer gate is connected to an input of a memory unit 26. The memory unit has a further input which is connected to an output of the erasing unit, an output lead 2601 and a further output which is connected to the input of a digital-to-analog converter 27. Converter 27 has an output which is connected to the input of a variable attenuator 29. The latter has an output 2901 which is connected to a terminal 2902 and to a further input of comparator 22.

A switch 28 connects terminal 12, either to terminal 2902 or to terminal 2102.

The attenuator further has a control input which is connected to a terminal 406 of the programming unit. The comparator 22 has an output lead 2201.

The programming unit has an output 407 which is connected to a memory unit 31, and an output 408 which is connected to a peak 17. The latter has an output which is connected to an input of alarm unit 5.

The operation of the processing apparatus which has been described hereinabove is roughly as follows:

The apparatus has first and second modes of operation according to whether switch 6 connects the output of attenuator 3 to the input 701 of the converter 7 or to the terminal 8, the latter being normally connected, through switch 9, to the input 1001 of recorder 10.

In the first mode of operation, the apparatus provides, either under digital form (on lead 2601) or on analog form (on lead 2101) an output which is a measure of the area of the surface of each peak, the said area being as well known, directly proportional to the concentration of each constituent of the gaseous mixture which is to be analysed. Under its analog form, this output is adapted for the direct control of a regulating system which is not part of the present invention. The said system is a feedback loop which controls the plant which produces the said mixture, as a function of the information contained in the said output.

In digital form, the information contained in said output is adapted to be further processed by a computer, before effecting control of the plant.

In the second mode of operation, the apparatus provides a display of successive peaks on the paper chart of recorder 10: this display is adapted to be used for continuously effecting a visual control of the operation of the plant.

It is to be understood that part of the apparatus may be omitted when only part of the above discussed different modes of control is needed.

One should have in mind that, as already explained in my copending applications, my copending patent application filed on Feb. 4, 1963, for "Automatic Detection of Peaks and Drifts," under Ser. No. 255,821, and my copending patent application filed on Feb. 4, 1963, for "Automatic Programming in the Utilization of a Variable Electrical Response," under Ser. No. 255,819, the processing of the signal which is applied on terminal 1 essentially includes, for either of the modes of operation above referred to: a resetting of the base line to a reference voltage (this resetting is to be effected in the time intervals between the successive peaks); a predetermined attenuation of each of the successive peaks, as the successive peaks each correspond to a different information, namely the concentration of each of the various constituents of a gaseous mixture, their respective amplitudes will differ and should be brought back to a constant value in order not to exceed, yet fully to utilize the maximal capacity of the counter 20, of the recorder 10 or any other instrument wherein the peaks are to be stored and a control of the programme in accordance with which the various processing operations are to be carried out.

The present invention more particularly refers to the resetting of the base line and, therefore, the other processing operations will not be disclosed here in great detail.

However, a complete apparatus has been illustrated for illustration purposes only, in view of enabling one properly to understand the object of the present invention. The disclosure will be made with specific reference to a chromatograph, though this invention may apply to other electrical responses of the general type disclosed hereinabove.

One should have in mind that the gaseous mixture to be analyzed by the chromatograph is continuously generated during operation of the plant. A clock generator 18 provides pulses at comparatively long regular time intervals.

Each pulse is applied, via lead 1801, to the chromatograph in view of starting an analysis. This analysis will provide, at input 1, a set of a predetermined number of peaks, each of the peaks corresponding to one of the constituents of the gaseous mixture. Normally, the respective time intervals between the successive peaks and the respective amplitude of the peaks have predetermined values.

The pulses from clock generator 18 also are applied to sequence control unit 16 in view of resetting it to zero. This is done well after an analysis has been completely performed, and enables the unit 16 to control a new analysis.

A brief discussion of the second mode of operation of the apparatus will now be made with reference to FIG. 1.

In the said mode, the switch 6 connects the attenuator to terminal 8, the switch 9 normally connects the latter terminal to the input 1001 of the recorder, the switch 13 connects terminals 202 and 1002, and the switch 16 connects terminals 1003 and 1501.

One will first consider what happens during a time interval between two successive peaks.

The recorder 10 permanently displays the electrical response signal (after passage thereof through units 2 and 3) on a paper chart, the motion of which is controlled by a signal provided by the programming unit, at output 404 thereof. The recorder includes, as will be explained more in detail hereinafter with reference to FIG. 4, means for generating a D.C. voltage, which is applied on terminal 1002, each time the displayed signal has an amplitude lower than a predetermined low value (which corresponds to the reference voltage above referred to) and means for generating a pulse, which is applied on terminal 1003, each time the displayed signal reaches a predetermined high value (which normally corresponds to the top of the peak).

It will be explained in detail hereinafter that the D.C. voltage which is generated each time the displayed voltage is lower than the said low level triggers a counting up operation of a reversible counter included in the resetting unit, with the result that the displayed voltage is increased, and that the absence of the said D.C. voltage (which corresponds to the fact that the displayed voltage exceeds the said low level) triggers a counting down operation of the reversible counter, with the result that the displayed voltage is decreased. It finally results that the displayed voltage is reset to the said low level in the absence of a peak.

Howevr, during the preceding peak, the displayed voltage has exceeded the predetermined high value above referred to, at which time a pulse has been transmitted (in a manner which will be explained hereinafter) from terminal 1003 to the delay unit 15. The said pulse has been transmitted after an adjustable delay, to the sequence control unit 16. The unit 16 is an electronic stepping switch of conventional design which generates a voltage on its output 1601 the first time it receives a pulse from the delay unit and generates a voltage on its output 1602 the second time, etc. Thus, the unit 16 responds to each of the successive peak tops by applying a pulse to a different one of the successive inputs of the programming unit.

The programming unit, for each of the operative intervals or "sequences" thus defined, provides on its output 402 an order signal which is adapted for enabling the resetting unit to operate, and further provides, on its output 401, an order signal which is adapted to set the attenuator to a predetermined attenuation value, the latter value being different for each of the peaks and selected as a function of the programme contained in unit 4. The programming unit may be of conventional design, or preferably is devised in accordance with my copending application filed on Feb. 4, 1963, for "Automatic Programming in the Utilization of a Variable Electrical Response," under Ser. No. 255,819.

In fact, the resetting unit operates only during a short time interval when it receives an order signal from terminal 402 and this is why, after the said short time interval, the displayed voltage may increase again when a succeeding peak will occur.

The delay provided by unit 15 is adjustable to a different value for each of the successive peaks. This delay is useful for avoiding that the programming unit will provide the attenuator with the order to change the attenuation value as soon as a pulse is generated on terminal 1003, i.e., at the top of the peak. The delay is adjusted in such a manner that the attenuation value will not change before the end of the peak.

A connection has been shown in FIG. 1 between terminal output 405 of the programming unit and an input of the delay unit: through the said connection, the delay unit may receive from the programming unit, when desired, an order to provide a constant time delay substantially larger than the variable delays it normally provides. This will be provided, for instance, in view of stopping the processing of the information when a number of intermediate peaks should be eliminated from the information which has to be processed.

Each time the drift of the base line exceeds a predetermined value the maximal capacity of the counter included in the resetting device is exceeded and, therefore, the latter device cannot properly operate: then an alarm unit 5 which is connected at the output of the said counter and responsive of any overstepping of the maximal capacity thereof is triggered into operation.

The alarm unit 5 also is triggered by a signal provided by the programming unit, at the output 403 thereof, each time the number of peaks in a sequence, as counted by counter 17, differs from that which was expected.

The output 408 of the programming unit transfers to memory unit 31 signals representative of the various sensitivities successively used in the course of an analysis, i.e., of the successive attenuation values with which the successive peaks have been recorded, as predetermined by the programme.

The information thus contained in memory unit 31 will be used by the above mentioned computer for calculating, from the attenuated peak amplitudes displayed in recorder 10, the initial amplitudes of the peaks as applied to input 1 of the apparatus.

Now, the first mode of operation of the apparatus will be discussed, still with reference to FIG. 1.

In the said mode of operation, the switch 6 is positioned so as to connect the attenuator to converter 7 and, therefore, the attenuated signal, instead of being displayed on the recorder 10, is converted into a train of recurrent pulses the frequency of which is proportional to the amplitude of the signal.

As will be explained more in detail with reference to FIGS. 2 and 5, the converter 7 provides an output frequency $F_0$ when the signal at the output of the resetting unit equals the reference voltage.

This frequency $F_0$ should be subtracted from the total output frequency $F+F_0$ of the converter and this is done by means of a device 19 which may be of conventional design, and is not part of the present invention. The counter 20 counts the pulses of frequency F during the time of each peak and, therefore, its count is proportional to the peak surface area. At the end of each peak, the said count is transferred to memory unit 26. Of course, before each transfer of the count into memory, the memory unit will be erased by means of a signal provided by unit 24, whereas, after each transfer of the count into memory, the counter 20 will be reset to zero.

The resetting order signals will be provided to counter 20 and to erasing unit 24 by order signal generator 23, whereas the transfer of the count into memory will be authorized by gate 25. The manner according to which units 23 and 25 are therselves controlled will be discussed hereinafter.

The contents of memory unit 26 are available on output lead 2601 under digital form, in view of being transferred to a computer, as explained hereinabove. The memory contents also may be converted into an analog signal by converter 27, whereas the count of the counter 20 is converted into an analog signal by converter 21: the latter signal will have an amplitude which is proportional to the surface area of a given peak, whereas the former signal will have an amplitude proportional to the surface area of the preceding peak. The comparator 22 will compare the amplitudes of the said signals. Should the difference between the said amplitude exceed a predetermined value, an inhibiting signal will be transmitted from the comparator to unit 25, in view of preventing the transfer into memory of an obviously erroneous count of the counter. It may be necessary, in the case when two succeeding peaks will normally have substantially different amplitudes, to attenuate one of the two signals before comparing them: this will be done in variable attenuator 29, when the programme so requires.

The comparator 22 further transmits an alarm signal on lead 2201 each time the amplitude difference exceeds the predetermined value as explained hereinabove.

The analog voltage from converter 21 may be transmitted to a regulating system through lead 2101, or be displayed on recorder 10 (through contacts 12 and 2102, then connected by switch 28, and contacts 11 and 1001, then connected by switch 9), according to the type of control which is to be performed.

The operating steps of the apparatus, in its first mode of operation which has just been roughly discussed, are as follows:

The galvanometer relay unit 14, as will be explained in more detail hereinafter, includes means for generating a first or a second D.C. voltage, which are applied on terminal 1401 each time the voltage at the input of the converter 7 respectively has an amplitude lower or higher than a predetermined low value (which corresponds to the reference voltage above referred to) and means for generating a pulse, which is applied on terminal 1402, each time the displayed voltage reaches a predetermined high value (which normally corresponds to the top of the peak). The D.C. voltage on terminal 1401 enables the resetting unit to operate exactly in the same manner which has been disclosed hereinabove with reference to the second mode of operation, during the time intervals, as determined from the programme, when the resetting unit receives a resetting order from output 402 of the programming unit.

At the top of a peak, a pulse will appear on terminal 1402 and, the switch 16 then connecting terminals 1402 and 1501, the said pulse will be transmitted, after a delay in unit 15, to the sequence control unit, and will control a new interval of operation of the programming unit, as explained hereinabove with reference to the second operating mode.

This means that everything will be prepared for the storage of a new peak with the proper attenuation, as defined by the programme. In other words, in the first mode of operation, terminals 1401 and 1402 respectively play the same part as do terminals 1002 and 1003 in the second mode, and everything takes place in the same way (including the operation of alarm unit 5, of the peak counter 32 and of the clock 18) except that the signal, after resetting of the base line and proper attenuation, is processed by converter 7 instead of being directly displayed on recorder 10.

The order signal generator 23 and the transfer gate 25 are respectively controlled for each of the above defined "sequences," by the above mentioned pulse, after transmission thereof through delay unit 15.

It is to be understood that the operation of units 20 to 29 is not part of the present invention and need not be disclosed in more detail.

Figure 2:
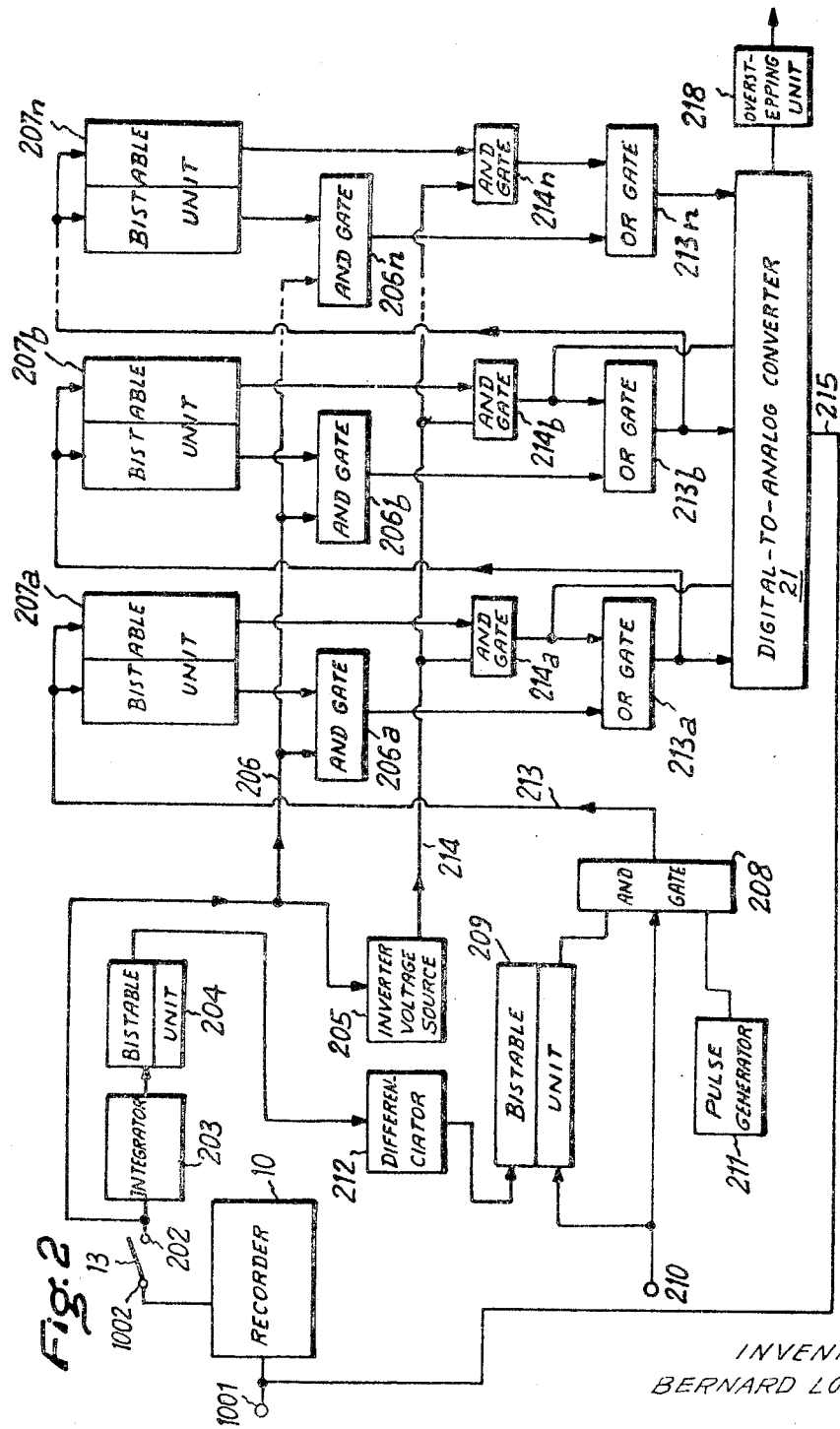
FIG. 2 is a block diagram of the resetting device which is incorporated in the apparatus of FIG. 1.

FIG. 2 illustrates a preferred embodiment of the resetting unit 2 of FIG. 1 which is the main object of the present invention.

This unit comprises a controllable voltage source 205 which has a control input connected to terminal 202, which is also connected through lead 206, to a first input of each of a plurality of AND-gates 206a, 206b, . . . 206n.

Each of said gates has a second input which is connected to a first output of a plurality of bistable units 207a, 207b, 207n. The input of the bistable unit 207a is connected to the output of an AND-gate 208 having first, second and third inputs. The said first input is connected to an output of a bistable unit 209, whereas the said second input is connected to a terminal 210 in turn connected to terminal 402 of the programme unit, and the said third input is connected to a clock pulse generator 211.

The bistable unit 209 has a first input which is connected to the output of a differentiating circuit 212, the input of which is connected to the output of a bistable device 204, and a second input which is connected to terminal 210. The bistable device 204 is connected at the output of an integrator 203 in turn connected to terminal 202.

A plurality of OR-gates 213a, 213b, . . . 213n have first inputs which are respectively connected to the outputs of the AND-gates 206a . . . 206n, and second inputs which are respectively connected to the outputs of a further plurality of AND-gates 214a, 214b . . . 214n.

The outputs of each of the plurality of OR-gates 213a, . . . 213n are connected to the respective inputs of a digital-to-analog converter 215, the output of which is connected to the terminal 1001.

The output of the OR-gate 213a is further connected to the inputs of the bistable unit 207b, while the output of the OR-gate 213b is connected to the inputs of the bistable unit 207c, etc.

The second inputs of the plurality of AND-gates 214a, 214b . . . 214n are connected to the second outputs of the bistable units 207a . . . 207n.

An overstepping control unit 218 is connected to an output of converter 215, and provides, at the output thereof, an alarming signal which is transmitted to unit 5 of FIG. 1, each time the maximal capacity of the counter has been exceeded.

It is remarked that the reversible counter which has been illustrated in FIG. 2 has been given by way of example only, any other conventional type of reversible counter being adapted for use in the resetting unit of FIG. 2.

The operation of the resetting unit which has just been disclosed is as follows:

The bistable unit 207a . . . 207n together with the AND-gates and the OR-gates, form a reversible counter which is initially set so as to provide, at the output of the converter 215, a voltage $V/2$, V being the voltage which corresponds to the maximal capacity of the counter. This voltage $V/2$ is thus obtained when the corrected voltage which is displayed by recorder 10 is equal to the low value already mentioned.

The counter has a counting up input which is formed by lead 206 which connects the AND-gates 206a . . . 206n, and a counting down input which is formed by lead 214 which connects the AND-gates 214a . . . 214n. This means that the count of the counter increases, and the voltage at the output of converter 215, increases in the same proportion, each time a D.C. voltage is directly received from terminal 202 whereas the count decreases, and the voltage at the output of converter 215 decreases in the same proportion, each time a D.C. voltage is received from the output of the inverter voltage source 205. These variations of the count of the counter should, however, be authorized by the presence of pulses from generator 211 at the output of the AND-gate 28, pulses which are generated at a fixed frequency and are "counted" or "backcounted" by the counter.

This authorization is given when the following conditions are simultaneously fulfilled:

A resetting order is applied from terminal 402 of the programming unit to terminal 210, A pulse is present at the output of differentiator 212, with the proper polarity for switching the bistable unit 209.

As will be explained in more detail with reference to FIG. 4, the recorder 10 provides a D.C. voltage at the output 1002 each time the corrected voltage applied between its input 1005 and the ground is under a predetermined low level, whereas it does not provide any output voltage when the corrected voltage is above the said level.

When the corrected voltage passes through the low level while increasing, it results a decaying edge of the D.C. voltage at terminal 202, which is integrated into a pulse by integrator 203. The bistable unit 204 shapes this pulse into a regular square wave which is again converted into a pulse by differentiator 212. The said pulse has the suitable polarity for switching bistable unit 209 so as to cut off the output thereof.

However, when the corrected voltage passes through the low level while decreasing, it results a rising edge of the D.C. voltage at terminal 202, which finally produces, at the output of differentiator 212, a pulse of opposite polarity with respect to the above mentioned pulse and therefore, the bistable unit is not switched.

Finally, when the displayed signal passes through the low level while decreasing, the counter will normally operate, whereas it will be inhibited as soon as the displayed signal has passed through the low level while increasing.

Figure 3:
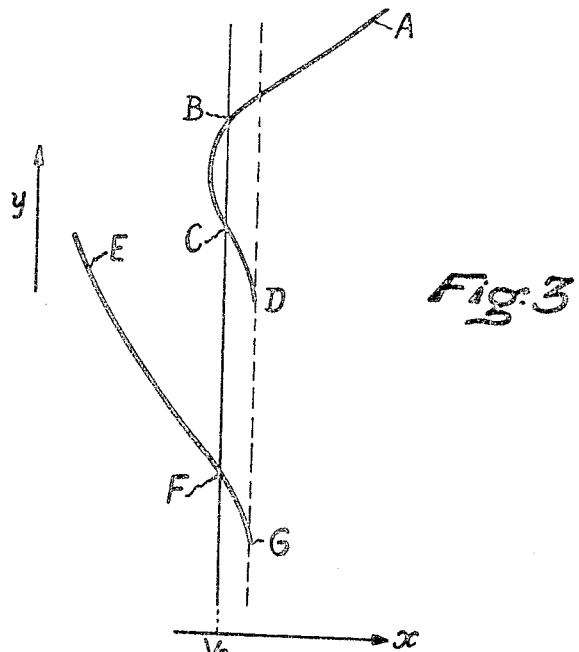
FIG. 3 is a diagram illustrating the operation of the resetting device.

Now, it will be referred to the diagram of FIG. 3 for fully understanding the operation of the resetting unit.

The arrow $y$ denotes the motion of the paper chart, while the arrow $x$ denotes the displayed voltage variations. $V_0$ is the "low level."

Along portion AB of the record, the displayed voltage is higher than $V_0$, while decreasing. This situation corresponds to the case when a positive drift of the base line has occurred, and the counter is counting down for decreasing the corrected voltage.

The recorder then provides no D.C. voltage on terminal 202 and, therefore, the voltage source 205 (which is for instance a D.C. amplifier supplied from an external source and normally blocked in the presence of a D.C. voltage at the control input thereof) supplies a voltage on lead 214 thus controlling the counting down operation of the counter.

Finally, the corrected voltage reaches point B and, in fact, due to the inertia of the movable member of the recorder, it takes a value lower than the low level. Then, a D.C. voltage appears on terminal 202. Said D.C. voltage stops the supply of lead 214 and supplies lead 206: it results that a counting up operation of the counter is started, and that the corrected voltage increases.

At point B, the sharp rising of the D.C. voltage at terminal 202 had no action on bistable unit 209, for the reasons already set forth. However, at point C, the sharp decay of the D.C. voltage at terminal 202 has the effect of switching bistable unit 209, with the result that the output thereof is cut off and, finally, the pulses from generator 211 cease to be transmitted to the counter. This finally means that the moving member of the recorder will stop at point D, the portion CD corresponding to the action of the last pulse which has been counted.

If one considers now the case when a negative drift of the base line has occurred, portion EF of the displayed voltage corresponds to a counting up operation of the counter. As soon as the low level is reached (point F), the output of bistable device 209 is cut off and the pulses cease to be transmitted to the counter.

Finally, due to this feature of the invention, the maximal error which can be made on the corrected voltage is equal to one step of the quantizer, i.e., the voltage which corresponds to one pulse in the counter. This error does not depend upon the inertia of the recorder and no hunting is likely to occur.

It is to be understood that, though the operation of the resetting device has been discussed and illustrated in FIG. 2 as connected to recorder 10, it will operate exactly in the same manner when connected to converter 7 of FIG. 1.

Figure 4:
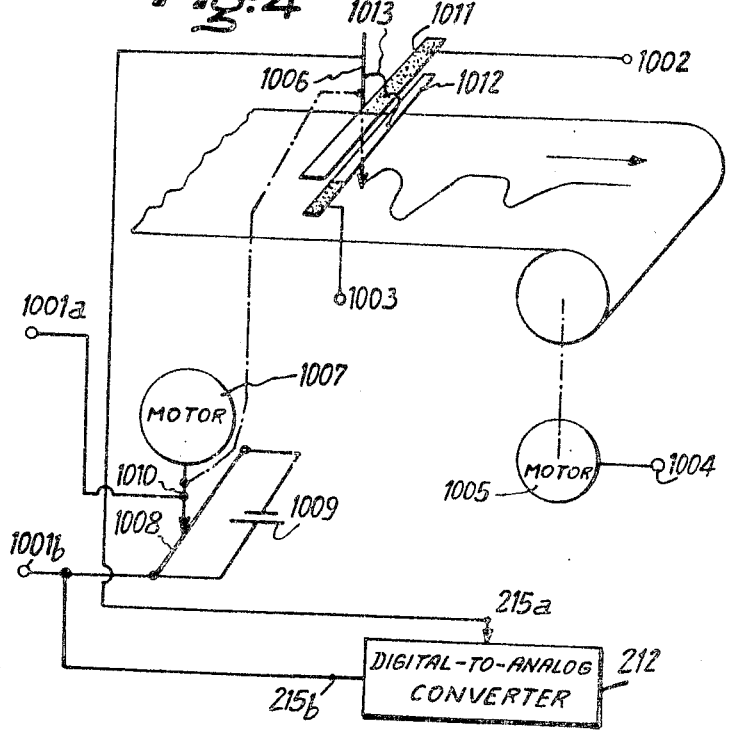
FIG. 4 is a diagrammatic illustration of a preferred embodiment of the paper chart recorder.

FIG. 4 illustrates a preferred embodiment of recorder 10. The paper chart is driven in the direction of the arrow, by means of a motor 1005 the operation of which is controlled by orders transmitted by lead 1004 from terminal 404 of the programming unit. The stylus 1006 of the recorder scans the paper in a direction perpendicular to the arrow, under the control of a motor 1007.

In the simplified diagram of FIG. 2, only one signal input 1001 has been illustrated: in fact, the recorder comprises two inputs 1001a and 1001b across which the attenuated electrical response signal is applied and to which the two outputs 215a and 215b of the converter 215 are respectively connected. The recorder includes a fixed lead 1008, one end of which is connected to terminal 1001b and the two ends of which are connected to a voltage source 1009.

A contact 1010 slides along lead 1008 and is driven by motor 1007 together with stylus 1006. The contact 1010 is connected to terminal 1001a and controls the operation of motor 1007. First and second bars 1011 and 1012 are supported, by means not shown, a little distance above the paper chart, parallel to the motion of the stylus. The latter supports a sensor 1013 which slides along both bars 1011 and 1012. Bar 1011 consists of an electrically insulating material in the left half thereof (which corresponds to the displayed voltages higher than the above mentioned "low level") and conductive in the right half thereof (which corresponds to the displayed voltage lower than the said level). Bar 1012 is insulating except for the left-end portion thereof, which corresponds to the displayed voltages higher than the said high level.

Terminal 1002 is connected to the conductive part of bar 1011, whereas terminal 1003 is connected to the conductive part of bar 1012.

The operation of the recorder is as follows:

When the current which controls the operation of motor 1007 and is supplied through slidable contact 1010 becomes null, contact 1010 and stylus 1006 stop moving and the position of the stylus then is indicative of the voltage across terminal 1001a and 1001b: said voltage is therefore displayed on the recorder paper chart.

Lead 215b is connected to converter 215a in such a manner that the voltage on terminal 1001b is constant and equal to $V/2$, V being the analog voltage which corresponds to the maximal capacity of the counter of the resetting unit.

The voltage $v$ on lead 215a varies between the limits $$-\frac{V}{2} \text{ and } +\frac{V}{2}$$

and therefore, the "corrected voltage" on stylus 1006, varies between the limits $$V_e + \frac{V}{2}$$

and $$V_e - \frac{V}{2}$$

$V_e$ between the attenuated electrical response voltage. It is clear that a D.C. voltage is transmitted to terminal 1002 each time the corrected voltage is under the low level and that a D.C. voltage is transmitted to terminal 1003 each time the corrected voltage exceeds the high level. The rising edge of the latter D.C. voltage will be converted into a pulse by conventional means, not illustrated, in view of operating the delay unit 15 (FIG. 1).

FIG. 5 illustrates a preferred embodiment of converter 7 and galvanometer relay unit 14.

The converter includes a differential amplifier 702 having a first input connected to a terminal 701a and a second input connected to a terminal 701b via a resistor 703. The attenuated electrical response voltage is applied across terminals 701a and 701b; terminal 701a is connected to terminal 215a of converter 215, while terminal 701b is connected to terminal 215b of the converter. The output of amplifier 102 is connected, via a constant-current generator 704, to the electrical circuit of a galvanometer 1403, in turn connected to a first terminal of a condenser 705 and to a trigger unit 706. Unit 706 has a control input 707 which is connected to terminal 701b, and an output 708 which is connected, on one hand, to the frequency subtractor 19 of FIG. 1 and, to the other hand, to the control input of an electronic switch 709, the latter connecting a second terminal of condenser 705 to terminal 701b.

The galvanometer has a movable pointer 1404 which is energized, through a supple lead 1405, from terminal 701a.

A sensor 1406, supported by pointer 1404, is adapted to slide along two elongated members 1407 and 1408 which are in the form of arcs of a circle and are supported, by means not shown, in a fixed position. Member 1407 is conductive in the left half thereof (which corresponds to the values of the corrected voltage lower than the "low level") and insulating in the left half thereof. Member 1408 is insulating, except its right end, which corresponds to the values of the corrected voltage higher than the "high level." The said right end is connected to terminal 1402, FIG. 1.

The operation of the voltage-to-frequency converter of FIG. 5 is as follows.

The electrical response voltage applied to terminal 701a will have the effect of providing at the output of amplifier 702, a voltage proportional to the amplitude of the said response, the latter voltage in turn controlling generator 704 so as to provide a proportional current. It results that condenser 705 starts to be charged. As soon as the voltage across terminals of condenser 705 reaches a predetermined triggering level, the device 706 is triggered and provides a pulse at the output 708 thereof. The said pulse has the effect of opening the switch 705 for a short time interval, so that condenser 705 will discharge. At the end of the pulse, the condenser again starts to be charged, and so on. Finally, as well known in this type of voltage-to-frequency converter pulses are generated at the output terminal 708 of the device, with a recurrent frequency proportional to the voltage across terminals 701a, 701b, i.e., to the voltage $$v + V_e - \frac{V}{2}$$

As explained hereinabove, the resetting device, during each resetting operation of the base line, resets the voltage $V_e + v$ on terminal 701a to a reference value generally the zero value. Therefore, the said recurrent frequency, in the absence of any peak, finally has a value to which is proportional to $V/2$. When a peak having an amplitude $V_p$ is present, the recurrent frequency at the output of converter 7 is $F + F_0$, F being proportional to $V_p$. As explained hereinabove, the device 19 subtracts the frequency $F_0$ and finally, provides to the counter a frequency which is at any time proportional to $V_p$, $V_p$ being the level difference between the peak and the corrected base line.

Now, it is clear that each time the corrected voltage on terminal 701a is under the "low level," a D.C. voltage is transmitted to terminal 1401 through lead 1405, sensor 1406 and the conductive part of member 1407. Therefore, the operation of the resetting device, in the case when the latter is cooperating with converter 7, is exactly the same as that which has been discussed hereinabove with reference to the case when the resetting device is cooperating with recorder 10.

Each time the corrected voltage exceeds the "high level," it is clear that a D.C. voltage is transmitted to terminal 1402, through coil 1405, sensor 1406 and the conductive portion of member 1407. Said D.C. voltage will be converted into a pulse for transmission to the delay unit 15 in the manner which has been explained hereinabove.

It is to be understood that various modifications could be made to the apparatus which is illustrated in the drawings, without departing from the spirit and scope of this invention.

What is claimed is:

1. In an apparatus adapted for processing an electrical signal which includes a number of successive comparatively steep amplitude voltage variations or "peaks" each respectively containing items of information of different nature and having, between the peaks, a comparatively slowly drifting minimal value or "base line," said apparatus including measuring means having a signal input and a movable member the position of which is indicative of the level of the electrical signal which is applied to said measuring means: the provision of a base line resetting device comprising: first circuit means, cooperating with said movable member, for generating a first control voltage each time the movable member indicates a level lower than a predetermined reference level; second circuit means, cooperating with said first circuit means, for generating a second control voltage each time the first control voltage is not generated; a reversible counter having an analog output, a pulse input and first and second control terminals, said first and second terminals being respectively connected to said first and second circuit means; a clock pulse generator; means connecting said clock pulse generator to the said pulse input, said counter being adapted for counting up each time the first control voltage is applied to the said first control terminal, and for counting down each time the second control voltage is applied to the said second control terminal, and means connecting the said analog output to the signal input of said measuring means, means coupled to said movable member for disconnecting said clock pulse generator from said counter when said movable member, in moving in a first direction, passes a predetermined threshold level.

2. In an apparatus adapted for processing an electrical signal which includes a number of successive comparatively steep amplitude voltage variations or "peaks," each respectively containing items of information of different nature and having, between the peaks, a comparatively slowly drifting minimal value or "base line," said apparatus including measuring means having a signal input, a conductive pointer movable along a predetermined path and the position of which is indicative of the level of the electrical signal which is applied to said measuring means; the provision of a base line resetting device comprising: an elongated member located parallel to said path and having a conductive portion and an insulating portion, conductive sensor means supported by said pointer in sliding contact with said elongated member; a reversible counter having an analog output, a pulse input and first and second control inputs, a clock pulse generator; gating means connecting said clock pulse generator to the said pulse input, said gating means having an inhibiting control input; means connecting the said analog output to the signal input of said generating means and to the pointer; means connecting the conductive portion of said elongated member to the first control input of the counter; means for generating a D.C. control voltage, said means having an output which is connected to the second control input of the counter and a control inhibiting input which is connected to the conductive portion of said elongated member; and means, responsive to the passage of said sensor means from the conductive portion to the insulating portion of said elongated member, for generating an inhibiting signal on the inhibiting control input of said gating means.

3. The apparatus of claim 2 further comprising an alarm unit having a control input; said reversible counter further includes means for providing a control signal each time the maximum capacity of the counter is exceeded, said means having a control signal output which is connected to the control input of said alarm unit.

4. In an apparatus for processing an electrical signal, which includes a number of successive comparatively steep amplitude voltage variations each of which respectively represent items of information of a different nature, and, between these voltage variations, a comparatively slowly drifting minimal value referred to as the base line, said apparatus including:

(a) means for measuring said electrical signal having a signal input terminal and movable output member, the position of which is indicative of the signal level applied to said measuring means, said measuring means further including means controlled by said movable member for generating a first control signal when said signal level exceeds a predetermined reference level and for generating a second control signal when said signal level is less than said predetermined reference level;

(b) a clock pulse generator;

(c) a base line resetting device of the feedback type connected to measuring means, said device including an up-down counter responsive to pulses delivered by said clock pulse generator, said counter counting up, when said first control signal is delivered thereto, and counting down, when said second control signal is delivered thereto;

(d) sensor means responsive to the movement of said movable member toward said predetermined reference level in a positive direction for inhibiting the accumulation of pulses in said counter when the passage of the movable member through the predetermined level has been effected; whereby the deadband of error about the predetermined reference level is decreased to a minimum value.

References Cited

UNITED STATES PATENTS

| | | | |
|---|---|---|---|
| 2,569,135 | 9/1951 | Trischka et al. | 235—178 |
| 2,676,253 | 4/1954 | Ayres | 328—146 |
| 2,715,678 | 8/1955 | Barney | 324—99 |
| 2,833,921 | 5/1958 | McCrory | 329—178 |
| 2,995,694 | 8/1961 | Sorkin et al. | 318—448 |
| 3,242,489 | 3/1966 | Leyde | 328—185 |
| 3,273,035 | 9/1966 | Inderkees | 328—151 |

RUDOLPH V. ROLINEC, Primary Examiner

ERNEST F. KARLSEN, Assistant Examiner

U.S. Cl. X.R.

324—99, 130